US007832970B2

(12) United States Patent
Wang et al.

(10) Patent No.: US 7,832,970 B2
(45) Date of Patent: Nov. 16, 2010

(54) FRICTION STIR NUT AND METHOD OF JOINING THEREWITH

(75) Inventors: Pei-Chung Wang, Shanghai (CN); Robin Stevenson, Bloomfield, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 0 days.

(21) Appl. No.: 12/265,874

(22) Filed: Nov. 6, 2008

(65) Prior Publication Data

US 2009/0061187 A1 Mar. 5, 2009

Related U.S. Application Data

(63) Continuation of application No. 11/055,368, filed on Feb. 10, 2005, now abandoned.

(51) Int. Cl.
 *F16B 37/06* (2006.01)
(52) U.S. Cl. .................. 411/171; 411/34; 228/114.5
(58) Field of Classification Search ............ 411/171, 411/34, 38; 228/114.5
 See application file for complete search history.

(56) References Cited

U.S. PATENT DOCUMENTS

| | | | |
|---|---|---|---|
| 2,188,422 A | 1/1940 | Waner | |
| 2,583,868 A * | 1/1952 | Mociun | 219/107 |
| 2,763,314 A | 9/1956 | Gill | |
| 3,030,705 A | 4/1962 | Gill | |
| 3,163,046 A | 12/1964 | Huston | |
| 3,215,026 A | 11/1965 | Davis | |
| 3,718,068 A * | 2/1973 | Passer | 411/38 |
| 3,750,525 A | 8/1973 | Waters et al. | |
| 3,916,970 A * | 11/1975 | Owens | 152/379.4 |
| 4,468,161 A * | 8/1984 | Krueger | 411/171 |
| 4,499,647 A | 2/1985 | Sakamura et al. | |
| 4,717,612 A * | 1/1988 | Shackelford | 428/116 |
| 4,817,264 A * | 4/1989 | Worthing | 29/512 |
| 4,832,549 A * | 5/1989 | Shibayama et al. | 411/171 |
| 4,920,833 A * | 5/1990 | Rosenthal | 81/124.1 |
| 5,051,048 A * | 9/1991 | Maddox | 411/34 |
| 5,536,344 A * | 7/1996 | van Dreumel | 156/73.5 |
| 5,713,706 A * | 2/1998 | Lozano | 411/171 |
| 5,795,118 A * | 8/1998 | Osada et al. | 411/171 |
| 5,879,115 A * | 3/1999 | Medal | 411/82 |
| 6,004,086 A | 12/1999 | Gand et al. | |
| 6,065,918 A | 5/2000 | Adams | |
| 6,067,839 A * | 5/2000 | Xie | 72/391.8 |
| 6,454,891 B1 * | 9/2002 | Goss | 156/73.5 |

(Continued)

*Primary Examiner*—Flemming Saether
(74) *Attorney, Agent, or Firm*—Cantor Colburn LLP

(57) ABSTRACT

A friction stir nut is disclosed. The friction stir nut includes a body, a cap, and an anti-rotation feature. The body has an elongated cylindrical shank extending between a first end and a second end, the cap being disposed at the second end, and the anti-rotation feature being disposed at the cap and/or an outer surface of the body. The body and cap have a blind axial hole extending from the first end to the second end, the first end being blind and the second end being open. The outer surface of the first end has a flat surface oriented substantially perpendicular to the axis of the shank, and the body has a cylindrical wall thickness suitable for receiving internal threads. In response to a mandrel tool friction stir welding the friction stir nut to a workpiece and then being extracted, uniform internal threads result at the body. The anti-rotation feature bonds to the workpiece by metallurgical bonding and/or mechanical bonding.

14 Claims, 3 Drawing Sheets

U.S. PATENT DOCUMENTS

| | | |
|---|---|---|
| 6,487,767 B1 | 12/2002 | Reid et al. |
| 6,572,007 B1 | 6/2003 | Stevenson et al. |
| 6,640,414 B2 | 11/2003 | Stevenson et al. |
| 6,676,007 B2 | 1/2004 | Stevenson et al. |
| 6,702,535 B1 | 3/2004 | Stevenson et al. |
| 6,729,531 B2 | 5/2004 | Stevenson et al. |
| 6,792,657 B2 | 9/2004 | Reid et al. |
| 6,990,722 B2 | 1/2006 | Reid et al. |
| 7,040,006 B2 | 5/2006 | Mauer et al. |
| 2006/0251489 A1 | 11/2006 | Denham et al. |

\* cited by examiner

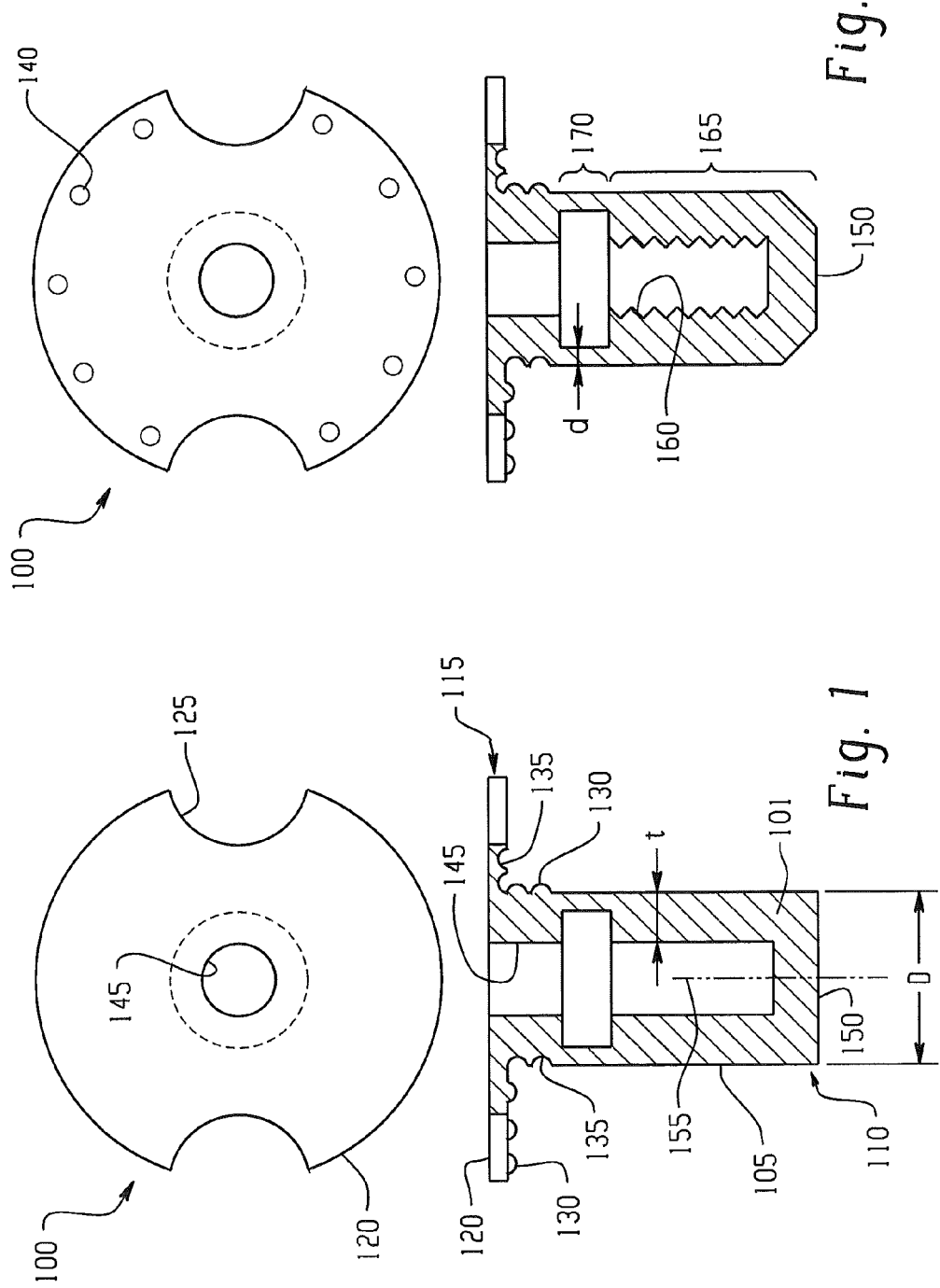

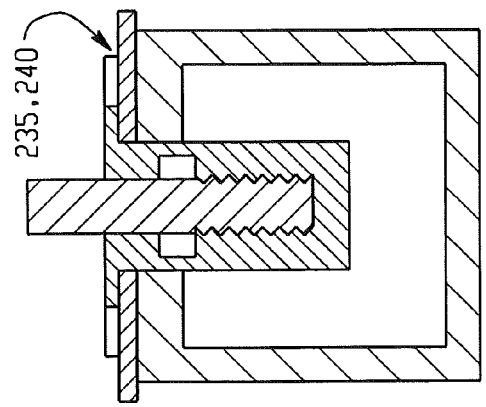
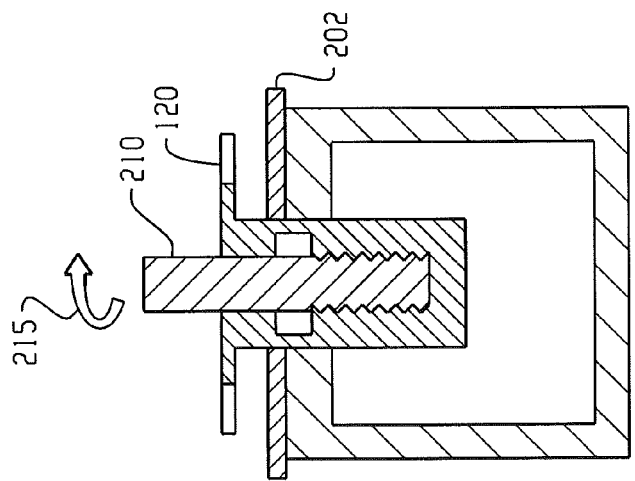
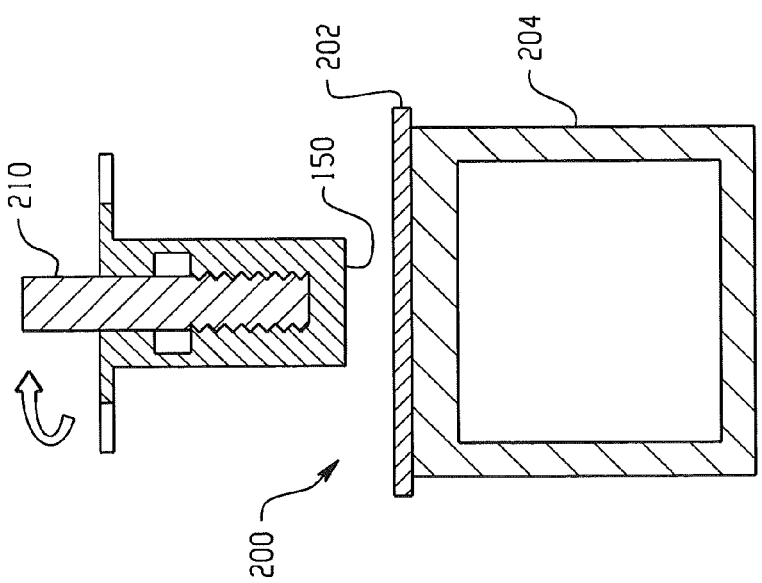

FRICTION STIR NUT AND METHOD OF JOINING THEREWITH

CROSS REFERENCE TO RELATED APPLICATIONS

This application is a continuation application of U.S. application Ser. No. 11/055,368 filed Feb. 10, 2005, which is hereby incorporated by reference in its entirety.

BACKGROUND OF THE INVENTION

The present disclosure relates generally to friction stirring and a method of joining therewith, particularly to a friction stir nut and a friction stir rivet nut, and a method of joining therewith.

Friction stir welding (FSW) is a method used to join metal workpieces that generally uses a cylindrical shouldered tool with a profiled pin that is rotated at the joint line between two workpieces while being traversed along the joint line. The rotary motion of the tool generates frictional heat that serves to soften and plasticize the workpieces. As the pin moves laterally, the softened material, contributed by both workpieces, intermingles in the wake of the traversing pin and cools and hardens due to the absence of further frictional stirring, creating a bond between the two workpieces.

Recent advances in friction stir processes have extended the FSW technique to friction stir riveting (FSR), where a stir rivet is rotated and advanced into an arrangement of workpieces to be joined such that the material of the workpieces plasticizes around the rivet during the friction stirring, and then hardens around the rivet when the body of the rivet stops rotating and the workpieces and rivet are allowed to cool.

Both of the aforementioned processes result in a bonded workpieces. However, in some instances it may be desirable to both bond the workpieces and provide a means for receiving additional hardware. Accordingly, there is a need in the art to further advance the technology of friction stir bonding in a manner that offers opportunities for the addition of supplementary features and capabilities through the use of additional hardware at the point of bonding.

BRIEF DESCRIPTION OF THE INVENTION

Embodiments of the invention include a friction stir nut suitable for friction stir welding to a workpiece via a mandrel tool. The friction stir nut includes a body, a cap, and an anti-rotation feature. The body has an elongated cylindrical shank extending between a first end and a second end, the cap being disposed at the second end, and the anti-rotation feature being disposed at the cap, at an outer surface of the body, or at both. The body and cap have a blind axial hole extending from the first end to the second end, the first end being blind and the second end being open. The outer surface of the first end has a flat surface oriented substantially perpendicular to the axis of the shank, and the body has a cylindrical wall thickness suitable for receiving internal threads. In response to the mandrel tool friction stir welding the friction stir nut to the workpiece and then the mandrel tool being extracted from the friction stir nut, uniform internal threads result at the body, and the anti-rotation feature bonds to the workpiece by metallurgical bonding, mechanical bonding, or both.

Other embodiments of the invention include a friction stir rivet nut suitable for friction stir welding to a workpiece via a mandrel tool. The friction stir rivet nut includes a body, a cap, and an anti-rotation feature. The body has an elongated cylindrical shank extending between a first end and a second end, a first portion proximate the first end, and a second portion proximate the second end. The first portion has a first nominal cylindrical wall thickness, and the second portion has a second nominal cylindrical wall thickness that is less than the first nominal cylindrical wall thickness. The cap is disposed at the second end, and the anti-rotation feature is disposed at the cap, at an outer surface of the body, or at both. The body and cap have a blind axial hole extending from the first end to the second end, the first end being blind and the second end being open. The first end has internal threads, and the outer end surface of the first end has a flat surface oriented substantially perpendicular to the axis of the shank.

Further embodiments of the invention include a method of friction stir welding an embodiment of the aforementioned friction stir rivet nut to workpieces via a mandrel. The mandrel is threadably engaged with the rivet nut, the rivet nut is positioned at a point of engagement of the workpieces, the mandrel is rotated about its rotational axis, and the rivet nut driven toward and into the workpieces such that resultant frictional heating between the rivet nut and the workpieces causes the materials of the workpieces to soften at a process temperature thereby providing a friction stirred displaceable path for the rivet nut to traverse. The rivet nut is driven along the displaceable path until the cap is seated against or partially into the workpieces. Further rotation of the mandrel is stopped and the workpieces and rivet nut are allowed to cool below the process temperature, thereby permitting the softened workpieces to harden. The mandrel is axially loaded with sufficient force such that the second portion of the body buckles at an opposite side of the workpieces to that of the cap, and the mandrel is rotationally extracted such that uniform internal threads result at the first portion.

BRIEF DESCRIPTION OF THE DRAWINGS

Referring to the exemplary drawings wherein like elements are numbered alike in the accompanying Figures:

FIGS. 1 and 2 depict in cross section longitudinal view exemplary friction stir rivet nuts in accordance with embodiments of the invention; and FIGS. 3A-F depict an exemplary friction stir riveting method in accordance with embodiments of the invention.

DETAILED DESCRIPTION OF THE INVENTION

Figure 3D:
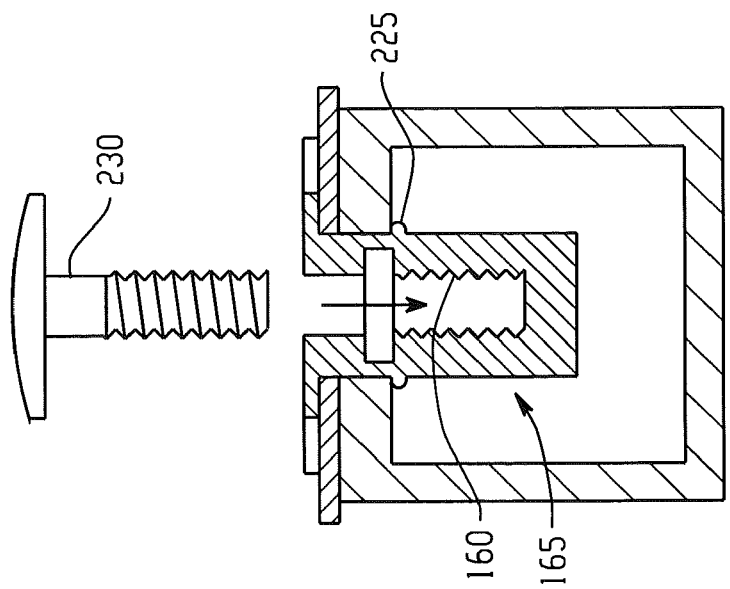

Embodiments of the invention disclose a friction stir nut and a friction stir rivet nut having a body with an elongated cylindrical shank and a cap at one end. The body and cap have an axial blind hole extending from the cap (the open end) to the end of the shank (the blind end). The outer end of the body at the blind end has a flat surface that engages the workpieces to be joined, thereby providing a friction stir surface that has a reduced tendency to undesirably displace the softened friction stirred material sideways in the joint between the workpieces. The shank of the body may have internal threads in place prior to friction stir welding, or may have a suitable wall thickness for receiving internal threads via a tapping operation during and/or subsequent to friction stir welding. In a friction stir nut, the nominal cylindrical wall thickness of the body may be uniform, whereas in a friction stir rivet nut, the nominal cylindrical wall thickness is reduced in a region proximate the cap, thereby enabling a pulling operation on the body to buckle the cylindrical wall of the body on an opposite side of the workpieces to that of the cap. The method of joining two or more workpieces using the friction stir nut or friction stir rivet nut may be accomplished in the absence of a preexisting hole in the workpieces to be joined.

FIG. 1 depicts a cross section view of an exemplary embodiment of a friction stir nut 100 having a body 105 with an elongated cylindrical shank (generally depicted by numeral 105) extending between a first end 110 and a second end 115, and a cap 120 at the second end 115. As used herein, reference numeral 100 refers to both a friction stir nut and a friction stir rivet nut, with the distinction between the two being more specifically described later. The body 105 and/or cap 120 may have anti-rotation features, such as scallops 125, projections 130, recesses 135, through holes 140 (best seen by referring to FIG. 2), or any combination of the foregoing. While the shapes of the anti-rotation features are depicted circular, they may be of any shape suitable for the purposes disclosed herein, such as geometrical indentation recesses and associated geometrical elevated features from a knurling operation for example. Accordingly, a combination of projections 130 and recesses 135 is herein considered representative of a knurl. While FIGS. 1 and 2 depict anti-rotation features 130, 135 and 140 only in certain areas, it will be appreciated that these features may be uniformly placed around the body 105 and cap 120, may be non-uniformly placed, may be all of one type, or may be of mixed types. For example, the anti-rotation features at the cap 120 may include one or multiple scalloped sections 125 at the perimeter of the cap 120, projections 130 at the underside of the cap 120, recesses 135 at the underside of the cap 120, and/or through-holes 140 at the cap. Similarly, the anti-rotation features at an outer surface of the body 105 may include one or multiple projections 130, recesses 135, and/or a knurl 130, 135. The body 105 and cap 120 have a blind axial hole 145 extending from the first end 110 to the second end 115, the first end 110 being blind and the second end 115 being open. The outer end surface of the first end 110 has a flat surface 150 oriented substantially perpendicular to the axis 155 of the shank 105. In an embodiment, the flat surface 150 of rivet nut 100 is flat to within plus-or-minus two degrees of perpendicular relative to axis 155.

Referring now to FIGS. 1 and 2 in combination, body 105 has a cylindrical wall thickness "t" suitable for receiving internal threads 160, which may be cut into body 105 prior to friction stir welding, or cut via a tapping operation during or subsequent to friction stir welding, which will be discussed in more detail later. As can be seen in FIG. 2, the flat surface 150 may only be a portion of the available flat surface from outside diameter D of body 105. In an embodiment, the flat surface 150 has a diameter equal to or greater than about 80% of diameter D.

In an embodiment of a friction stir rivet nut 100, where it is desirable for the body to buckle during a pulling operation thereby providing a rivet-like compressive load on the workpieces, the body 105 includes a first portion 165 and a second portion 170. The first portion 165 has a first nominal cylindrical wall thickness "t" suitable for receiving internal threads, and the second portion 170 has a second nominal cylindrical wall thickness "d" that is less than the first nominal cylindrical wall thickness, thereby resulting in the second portion 170 having a compressive strength that is less than the compressive strength of the first portion 165. The first portion 165 is proximate the first end 110 and the second portion 170 is proximate the second end 115. In response to a mandrel tool 210, best seen by referring to FIG. 3, friction stir welding the friction stir rivet nut 100 to the workpieces 200, and then the mandrel tool 210 being pulled (see description relating to FIG. 3D), the second portion 170 of the body 105 buckles at an opposite side of the workpiece to that of the cap 120. As will now be appreciated, a friction stir rivet nut differs from a friction stir nut by the presence of the second portion 170 having a nominal wall thickness "d" that is allowed to buckle to provide a rivet-like compressive load on the workpieces 200.

Referring now to FIGS. 3A-F, six exemplary frames of a method for friction stir welding a friction stir rivet nut 100 to workpieces 200 via a mandrel tool 210 are depicted. Workpieces 200 may be a sheet 202 placed on top of a tubular structure 204 for example, may be a single part for example, may be a solid block of metal such as aluminum for example, or may be any other set of materials desired to be and suitable to be friction stir welded using a friction stir nut or friction stir rivet nut 100. In all embodiments of FIGS. 3A-F, workpieces 200 are supported in a suitable fashion.

In FIG. 3A, the mandrel 210 is threadably engaged with the rivet nut 100 and positioned at the desired point of engagement with the workpieces 200. While not shown, it will be appreciated that mandrel 210 is connected to a rotary machine for providing the desired rotation and driving action for friction stir welding. In an embodiment, mandrel 210 is driven at a rotational speed of about 12,000 revolutions per minute (rpm), and at an axial downward speed of about 12 millimeters per minute (mm/min).

In FIG. 3B, mandrel 210 is rotated 215 about its rotational axis, which is the same as axis 155, and the rivet nut 100 is driven toward and into the workpieces 200 such that resultant frictional heating between the rivet nut 100 and the workpieces 200, and more particularly frictional heating initiated by the friction stir interaction between the flat surface 150 of the rivet nut 100 and the workpieces 200, causes the materials of the workpieces 200 to soften at a friction stir process temperature, thereby providing a friction stirred displaceable path for the rivet nut 100 to traverse. In an embodiment, the friction stir process temperature is greater than 20 deg-C. and less than or equal to the melt temperature of the workpieces 200. Where the workpieces 200 are aluminum, the process temperature is less than or equal to about 660 deg-C., for example, and in an embodiment where the workpieces 200 are thermoplastic, the process temperature is less than the melt temperature of the respective thermoplastic. The rivet nut 100 is driven along this displaceable path until the cap 120 is seated against or partially embedded into the workpieces 200. In this manner of friction stirring, the rivet nut 100 may be driven into workpieces 200 absent a preexisting hole in the workpieces 200. While it may be possible to rotate and drive rivet nut 100 at sufficient speed and rate to cause melting of workpieces 200, it is contemplated that rotating and driving rivet nut 100 to cause softening of workpieces 200 is sufficient for producing a suitable joint. In an embodiment, mandrel 210 is rotated at a speed of about 12,000 rpm and is driven at a rate of equal to or greater than about 6 mm/min and equal to or less than about 150 mm/min. However, it is contemplated that rotational speeds of equal to or less than about 12,000 rpm may be suitable for the purposes disclosed herein. As a result of the rotational speed in combination with the drive rate, the friction heating initiated between the flat surface 150 of rivet nut 100 and the surface of workpiece 202, a friction stir process temperature is established that results in the softening of workpieces 200, and preferably but not necessarily results in softening without melting. As discussed previously, the process temperature is that temperature between room temperature and the melt temperature of workpieces 200 at which the workpieces 200 are soft enough to provide a displaceable friction stir path for rivet 100 to traverse. In an embodiment, the process temperature is substantially less than the melt temperature of rivet nut 100.

In an embodiment, and with reference still to FIG. 3B, mandrel 210 drives rivet nut 100 toward workpieces 200 until the underside of cap 120 is in loaded contact with the topside surface of workpiece 202, resulting in friction stirring and partial penetration of cap 120 into the surface of workpiece 202, holds the 12,000 rpm rotation of mandrel 210 for a defined period of time, such as two seconds for example, and then stops further rotation to allow workpieces 200 and rivet nut 100 to cool below the process temperature. During the cooling, the softened workpieces 200 harden.

In an alternative embodiment, mandrel 210 is held at the 12,000 rpm rotation for a defined period of time subsequent to the underside of cap 120 being seated against the topside surface of workpiece 202, and is then stopped to allow workpieces 200 and rivet nut 100 to cool below the process temperature.

In FIG. 3C, rotation of the mandrel 210 is stopped to allow the workpieces 200 and rivet nut 100 to cool below the process temperature, thereby permitting the softened workpieces 200 to harden. During the hardening phase, the flowable friction stir material that has flowed into and around the anti-rotation features 125, 130, 135, 140 of rivet nut 100 also hardens, thereby providing a mechanical engagement between rivet nut 100 and workpieces 200 that resists an applied torque on rivet nut 100 about axis 155.

In FIG. 3D, and subsequent to hardening, the mandrel 210 is axially loaded in tension (pulled upward) 220 with sufficient force such that the second portion 170 of the body buckles 225 (best seen by referring to FIGS. 3E and F) at an opposite side of the workpieces 200 to that of the cap 120.

Figure 3E:
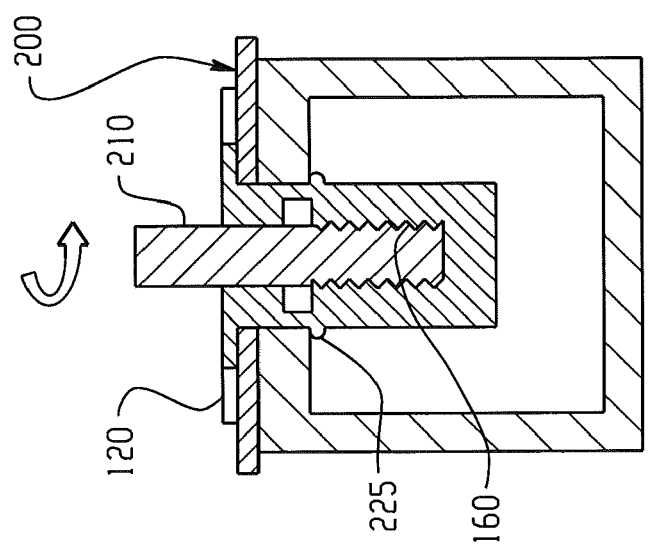
Figure 3F:
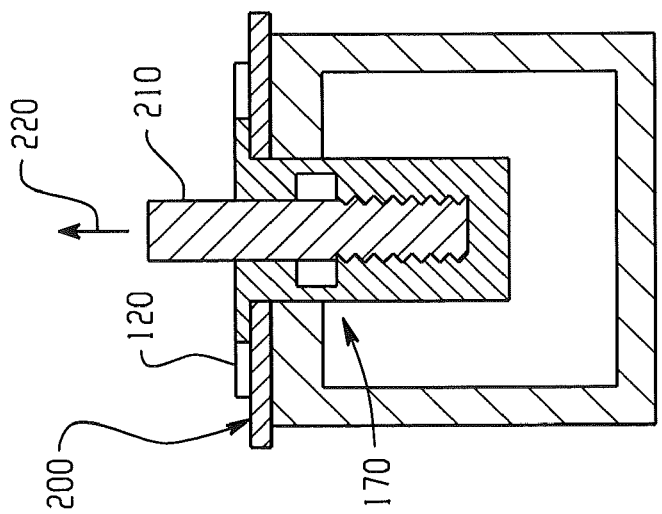

In FIG. 3E, the mandrel 210 is rotationally extracted from the rivet nut 100 such that uniform internal threads 160 result at the first portion 165 of the body 105. In an embodiment, mandrel 210 is of a machine tap construction such that threads are cut into the first portion 165 during the phase depicted in FIG. 3A, and then cleaned out during the phase depicted in FIG. 3E. In another embodiment, first portion 165 has pretapped internal threads (see FIG. 2 in comparison to FIG. 1) that are cleaned out during the phase depicted in FIG. 3E. In this manner, any damage at the internals threads 160, resulting from the thermal and/or mechanical stress of the friction stir process depicted in FIGS. 3A and B and/or the pulling process depicted in FIG. 3D, is corrected for by the machine tap construction of the mandrel 210 in response to its being rotationally extracted during the phase depicted in FIG. 3E. In response to friction stir welding the rivet nut 100 to the workpieces 200 and then extracting the mandrel 210 from the rivet nut 100, not only do uniform internal threads 160 result at the body 105, but also the anti-rotation feature 125, 130, 135, 140 bonds to the workpieces 200 by metallurgical bonding 235, mechanical bonding 240, or both, thereby providing sufficient anti-rotation for the insertion of a mechanical fastener 230, as depicted in FIG. 3F. Also, in response to the mandrel 210 being rotationally extracted from the rivet nut 100, the workpieces 200 are held together at the point of engagement by the stirred, intermingled softened materials of the workpieces 200, the differential thermal contraction of the workpieces 200 and the rivet nut 100, the mechanical interference between the anti-rotation feature 125, 130, 135, 140 and the workpieces 200, the mechanical loading between the buckled 225 second portion 170 of the body 105 and the workpieces 200, or any combination of the foregoing.

During the friction stir welding of rivet nut 100 to workpieces 200, it is contemplated that the closer the diameter of flat surface 150 is to the diameter D of the body 105, the less the tendency will be to displace the softened friction stirred material sideways into the joint between the workpieces. The use of flat surface 150 provides an effective way of initiating and generating frictional heating as the rotating flat surface 150 of rivet nut 100 is driven into workpieces 200, and the use of a 100% flat surface 150 provides an effective way of reducing the tendency for the displaced material along the displaceable path to penetrate the region between workpieces 200 at the faying surfaces as rivet nut 100 is driven into and through workpieces 200. Notwithstanding this consideration however, it is contemplated that a flat surface diameter equal to or greater than about 80% of diameter D is sufficient. In an embodiment, rivet nut 100 is selected to be copper, titanium, iron 101, or any alloy having at least one of the foregoing materials. If the rivet nut 100 is steel, it is preferable to use low or medium carbon steel. However, for embodiments of the invention absent a thinned down second portion 170, high carbon steel may be applicable. As used herein, medium carbon steel refers to a steel having equal to or greater than about 0.29 weight % carbon and equal to or less than about 0.53 weight % carbon, and high carbon steel refers to a steel having equal to or greater than about 0.55 weight % carbon and equal to or less than about 0.95 weight % carbon. In an embodiment having a thinned down second portion 170, steel having a carbon content of equal to or less than 0.4 weight % carbon is preferred, and steel having a carbon content of equal to or less than 0.25 weight % carbon is more preferred.

In accordance with embodiments of the invention, it is contemplated that 3 mm thick workpieces 202 and 204 made of 5052 aluminum may be successfully joined. However, it is also contemplated that embodiments of the invention also offer opportunities for joining dissimilar materials including but not limited to: composites to aluminum; polymers to aluminum; and, aluminum to magnesium. For a composite to aluminum, or a polymer to aluminum joint, it is contemplated that the aluminum be mounted below the composite or polymer so that the buckling of rivet nut 100 during the pulling operation may engage the aluminum as it is buckled, while the composite or polymer is held by the cap 120 of body 105, and thus subjected to a lower, less localized stress.

As disclosed, some embodiments of the invention may include some of the following advantages: the ability to join workpieces together and provide a threaded insert (nut) in the absence of a preexisting hole, thereby minimizing clearance, tolerance, fit-up and alignment issues, particularly for multi-member stack-ups; improved flow control of the displaced material that reduces its tendency to penetrate the joint area between the workpieces, thereby reducing the likelihood of the displaced material forcing the workpieces apart as it cools and hardens, leaving a large gap therebetween; the ability to provide a friction stirred riveted assembly with a means for receiving a fastener; the ability to provide a solid block of aluminum, such as an aluminum engine block of a vehicle, with a friction stirred threaded insert made of steel; and, the opportunity for friction stir joining dissimilar materials while also providing a means for receiving a fastener at the point of engagement.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A friction stir rivet nut in combination with a workpiece, the combination comprising:
   a workpiece and a friction stir rivet nut, the friction stir rivet nut comprising a material capable of being friction stir welded to the workpiece via a mandrel tool, the friction stir rivet nut further comprising:
   a body having an elongated cylindrical shank extending between a first end and a second end, the body comprising a first portion proximate the first end and a second portion proximate the second end, the first portion having a first nominal cylindrical wall thickness, the second portion having a second nominal cylindrical wall thickness that is less than the first nominal cylindrical wall thickness;
   a cap at the second end; and
   an anti-rotation feature at the cap, at an outer surface of the body, or at both, the anti-rotation feature comprising a void in material forming the friction stir rivet nut;
   wherein the body and cap have a blind axial hole extending from the first end to the second end, the first end being blind and the second end being open, the first end having uniform internal threads, the outer end surface of the first end having a flat surface oriented substantially perpendicular to an axis of rotation of the shank;
   wherein the anti-rotation feature of the friction stir rivet nut is metallurgically and mechanically bonded to the workpiece;
   wherein a metallurgically bonded region between the friction stir rivet nut and the workpiece comprises plasticized material of the workpiece.

2. The combination of claim 1, wherein:
   a mechanically bonded region between the friction stir rivet nut and the workpiece is defined in response to the mandrel tool friction stir welding the friction stir rivet nut to the workpiece and then the mandrel tool being pulled, thereby causing the second portion of the body to buckle at an opposite side of the workpiece to that of the cap.

3. The combination of claim 2, wherein:
   in response to the mandrel tool friction stir welding the friction stir rivet nut to the workpiece and then the mandrel tool being rotationally extracted from the friction stir rivet nut, the uniform internal threads remain at the body.

4. The combination of claim 1, wherein:
   the anti-rotation feature comprises at least one of a recess profile, a scallop profile, and a hole profile.

5. The combination of claim 1, wherein:
   the anti-rotation feature at the cap comprises at least one of a scalloped section profile at a perimeter of the cap, a recess profile at an underside of the cap, and a through-hole profile at the cap.

6. The combination of claim 1, wherein:
   the anti-rotation feature at an outer surface of the body comprises a recess profile, a projection profile, or both.

7. The combination of claim 1, wherein:
   the body and cap comprise iron.

8. The combination of claim 1, wherein:
   the body and cap comprise a material having a higher melting point than that of a material of the workpiece.

9. The combination of claim 1, wherein:
   the flat surface oriented substantially perpendicular to the axis of the shank is perpendicular to within plus-or-minus two degrees thereof.

10. The combination of claim 9, wherein:
    the flat surface has a diameter equal to or greater than about 80% of the outside diameter of the first end of the body.

11. The combination of claim 1, wherein the metallurgically bonded region comprises material of the workpiece intermingled with material of the friction stir rivet nut.

12. A friction stir rivet nut in combination with a workpiece, the combination comprising:
    a workpiece and a friction stir rivet nut, the friction stir rivet nut comprising a material capable of being friction stir welded to the workpiece via a mandrel tool, the friction stir rivet nut further comprising a body, and a cap disposed at one end of the body, the cap comprising an anti-rotation feature comprising at least one of a recess profile, a scallop profile, and a hole profile;
    wherein the friction stir rivet nut is metallurgically and mechanically bonded to the workpiece, and wherein the anti-rotation feature is metallurgically and mechanically bonded to the workpiece;
    wherein a metallurgically bonded region between the friction stir rivet nut and the workpiece comprises plasticized material of the workpiece.

13. The combination of claim 12, wherein:
    a mechanically bonded region between the friction stir rivet nut and the workpiece comprises a portion of the workpiece being in compression between a cap portion of the friction stir rivet nut on one side of the workpiece and a buckled portion of the friction stir rivet nut on an opposite side of the workpiece.

14. The combination of claim 11, wherein the metallurgically bonded region comprises material of the workpiece intermingled with material of the friction stir rivet nut.

* * * * *